United States Patent [19]

Murray

[11] 4,277,210

[45] Jul. 7, 1981

[54] ADJUSTABLE ANGLE STAR FEED MACHINING SLIDE

[75] Inventor: John T. Murray, San Jose, Calif.

[73] Assignee: United Centrifugal Pumps, San Jose, Calif.

[21] Appl. No.: 84,090

[22] Filed: Oct. 12, 1979

[51] Int. Cl.³ .......................... B23C 3/02; B23B 3/00; B23B 51/00
[52] U.S. Cl. ..................................... 409/191; 82/2 E; 408/147
[58] Field of Search ................. 409/185, 191; 82/2 E, 82/1.2, 1.3, 1.4, 1.5, 2 A; 408/147, 152

[56] References Cited

U.S. PATENT DOCUMENTS

| 107,918 | 10/1870 | Jones | 82/2 E |
| 777,952 | 12/1904 | John | 409/185 |
| 2,841,039 | 1/1958 | Stastny | 409/191 |

FOREIGN PATENT DOCUMENTS

| 105527 | 9/1899 | Fed. Rep. of Germany | 82/2 E |
| 712890 | 10/1931 | France | 82/2 E |
| 1388891 | 1/1965 | France | 82/2 E |
| 48833 | 3/1921 | Sweden | 82/1.4 |

Primary Examiner—Harrison L. Hinson
Attorney, Agent, or Firm—Robert G. Slick

[57] ABSTRACT

In a machine for machining metal having a rotating cutting head with a star feed for advancing the cutting head, an adjustable angle drive is provided whereby one can machine a conical concave or convex surface.

2 Claims, 6 Drawing Figures

ADJUSTABLE ANGLE STAR FEED MACHINING SLIDE

SUMMARY OF THE INVENTION

Machines for machining metal are common wherein a cutting head revolves over a work piece and wherein a star wheel slide mounted on a work piece support arm contacts a fixed pin at each revolution, advancing the cutting head. The disadvantage of such machines is that the slides are adapted only to machining straight or angular cuts and are not adjustable for machining a variety of conical surfaces.

In accordance with the present invention, a metal cutting machine is modified in such a manner that the angle of the cut can be adjusted so that it is easy to make an infinite variety of selected conical cuts which may be either concave or convex.

Generally speaking, the objects of the present invention are achieved by providing an adjustable angle slide for a tool holder on a support arm rotated by a spindle and by providing a flexible connection between the usual star wheel and the tool holder slide so that the star wheel can drive the tool advancing mechanism even when the tool holder is at an angle relative to the work piece.

The present invention can be used with any metal cutting machine where a star feed slide can be utilized or adapted.

Various other features and advantages of the invention will be brought out in the balance of the specification.

DESCRIPTION OF THE PREFERRED EMBODIMENTS

Figure 1:
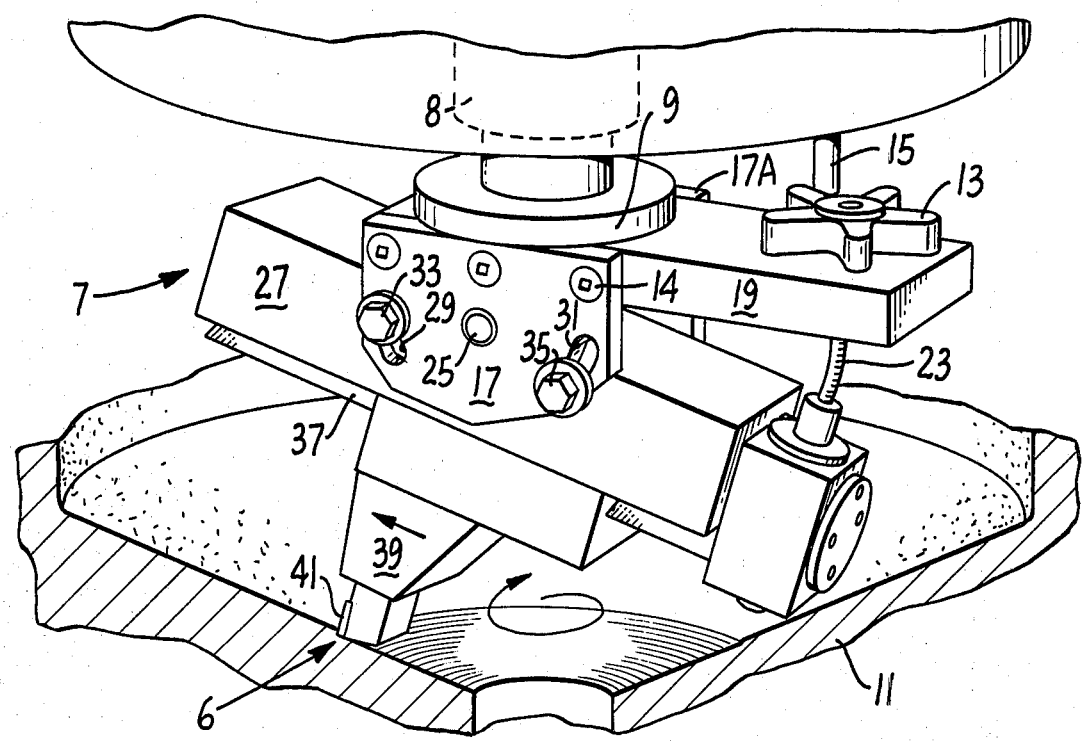
FIG. 1 is a perspective view of a modified star feed embodying the present invention.

Referring now to the drawings by reference characters, the star feed of the present invention is applied to a machine having a rotating spindle 8 connected to a holder, generally designated 7, which drives a tool 6 in a circular path over a work piece 11. Such machines employ a star feed which consists of a star wheel 13 which contacts a trip pin 15 at each revolution of the spindle 8, advancing the star wheel by one tooth. This movement of the star wheel is translated into a horizontal movement of the tool through the action of a feed screw as is later described in detail. Thus, each time the spindle 8 revolves, the tool advances by a small increment so that in effect a series of concentric circumferal cuts are made, eventually machining the entire surface of the work piece.

In the past, such machines moved the tool at fixed angles to the spindle of the tool holder so that they were capable of machining only one type of cut.

In accordance with the present invention, the machine has been modified so that the star feed is utilized to move a tool holder at an adjustable angle to the shaft of the tool holder or shaft so that conical surfaces, in infinite variety, either concave or convex, can be machined.

In accordance with the present invention, collar 9 is part of a tool holder having a necked portion 8 attached to the spindle of a machine tool. Adapter arm 19 is fastened to collar 9 by machine screws 12. Pivot plates 17 and 17A are rigidly attached to the adapter arm 19 by means of screws 14. The adapter arm 19 is provided with a bearing assembly 21, preferably of the ball type, to support star wheel 13 for rotation. A flexible shaft 23 transmits the motion of the star wheel as is later explained.

At the center of the pivot plates 17 and 17A is a shaft 25 on which is mounted the slide assembly 27. The slide assembly can rotate, through a limited angle, with respect to the pivot plates. At each side of the pivot plates are arcuate slots 29 and 31 and bolts 33, 33A, 35 and 35A pass through the arcuate slots and into the slide assembly whereby the slots limit the angular movement of the slide assembly and also enable one to lock the slide assembly at a desired angle by tightening the bolts.

Figures 2, 3:
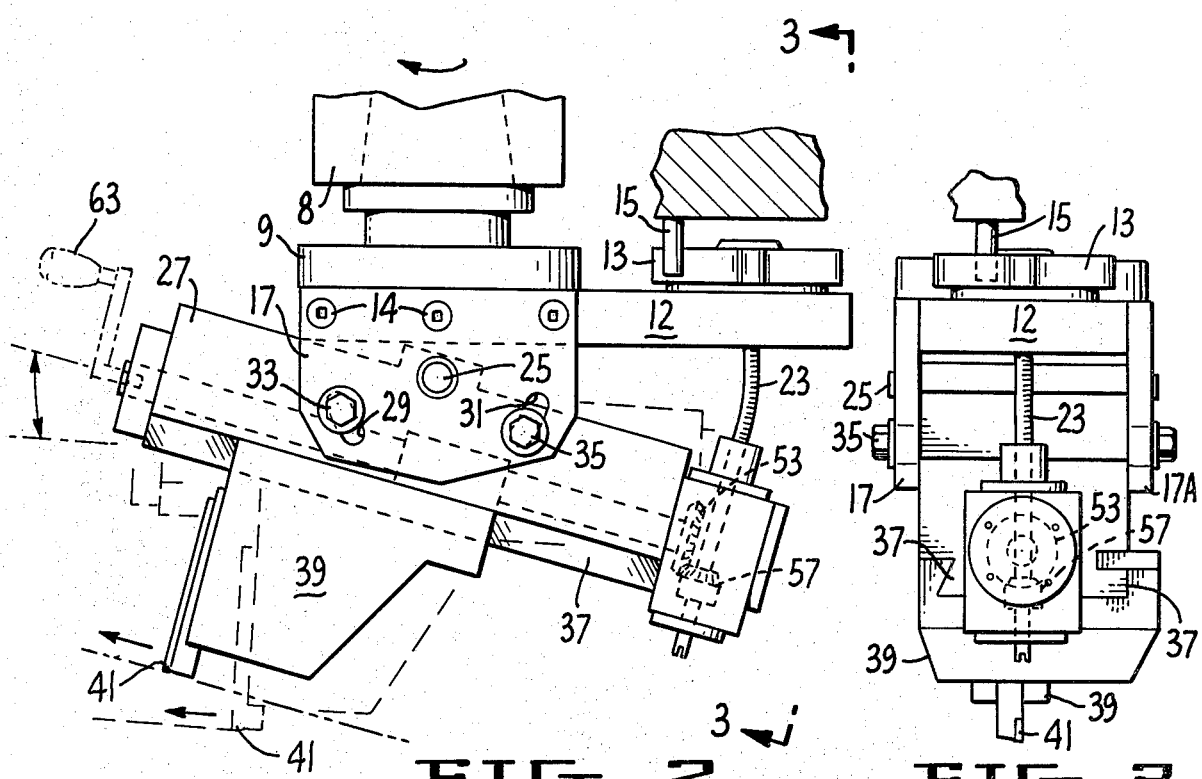
FIG. 2 is a side view of the star feed.
FIG. 3 is an end view on the line 3—3 of FIG. 2.
Figure 4:
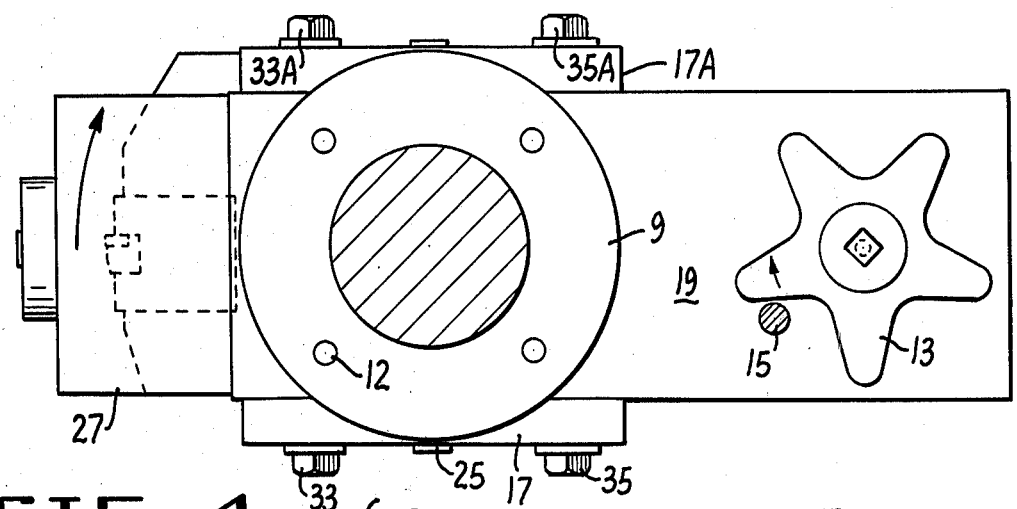
FIG. 4 is a plan view of the star feed.
Figure 5:
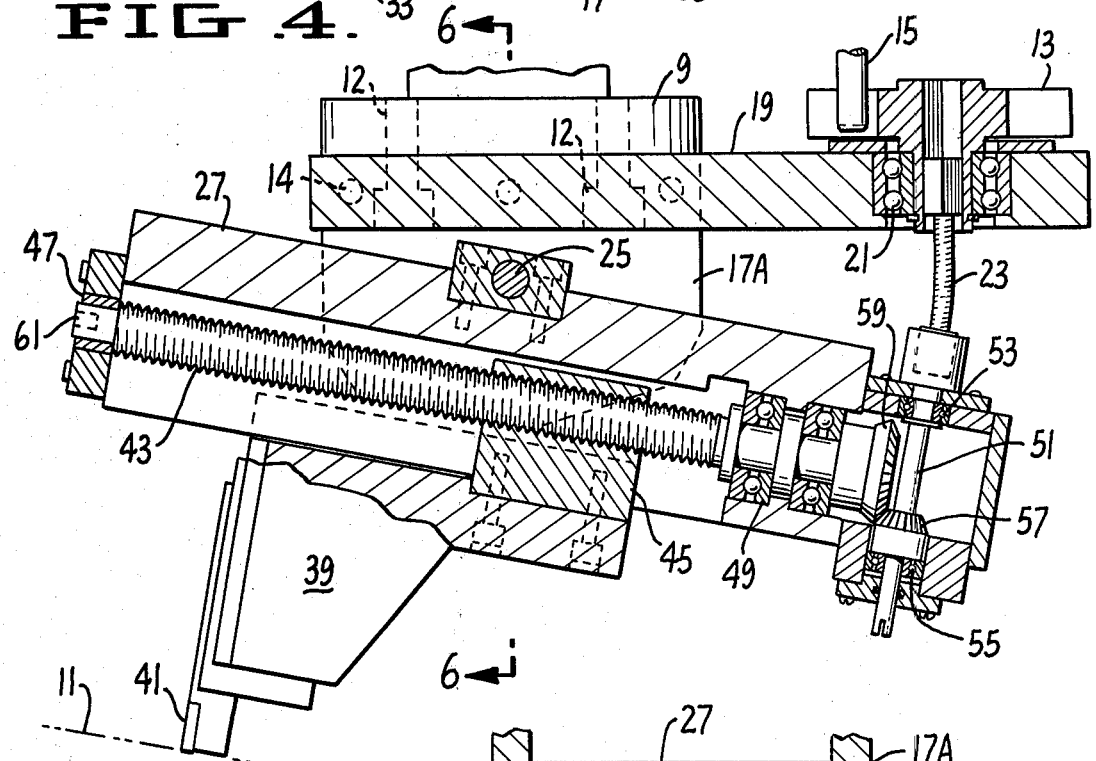
FIG. 5 is a sectional view through the center of the star feed.
Figure 6:
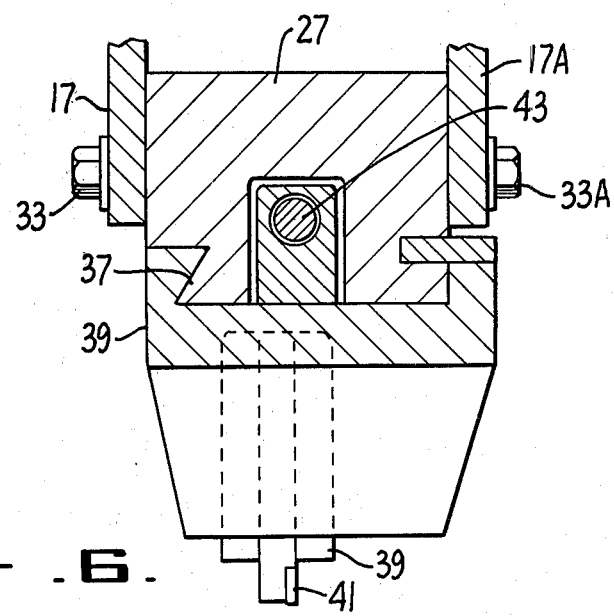
FIG. 6 is a section on the line 6—6 of FIG. 5.

At the bottom of the slide assembly are the guideways 37 and the tool block 39 is mounted to slide back and forth on these guideways as is best seen in FIG. 3.

The tool block 39 supports a cutting tool 41 and the position of the tool block 39 is determined by the lead screw 43 which passes through the threaded member 45 which forms a part of the slide assembly. The lead screw 43 is mounted for rotation within the slide assembly 27 by means of bearings 47 and 49.

As was previously mentioned, motion of the star wheel 13 is transmitted through the flexible shaft 23. This motion is transmitted to a solid shaft 51 mounted on bearings 53 and 55 of the slide assembly. Shaft 51 carries a bevel gear 57 which meshes with a bevel gear 53 on one end of the feed screw 43. Thus, any rotation of the star wheel is transmitted to the feed screw to advance tool block 39. The end of the feed screw is slotted at 61 to receive a crank 63 for the purpose of returning the tool block to the starting position at the completion of a cut.

The operation of the device is believed apparent; normally, the tool block would be retracted so that the tool 41 would be at the center of the work piece 11. Bolts 33, 33A, 35 and 35A would be loosened and the slide assembly 27 would be tilted to a desired angle and the bolts tigthened to lock the slide assembly in place. The spindle 8 would then be started, causing the cutting action to take place in known manner. As the star wheel 13 contacts the trip pin 15 on each revolution of spindle 8, the star wheel would be advanced one tooth, which motion would be transmitted to lead screw 43, advancing the tool. It is apparent that the cut would be at an angle to the work piece if the slide assembly is at an angle. At the completion of the first cut, the tool can be cranked back to the center and spindle 8 lowered for the next cut and so on until the machining operation is complete if more than one cut is required.

If desired, the feed of the tool slide can be immediately stopped by retracting the star wheel trip pin 15.

Many variations can be made in the structure shown without departing from the spirit of this invention.

I claim:

1. In a metal cutting machine, said machine having a rotating spindle supporting a tool holding slide wherein a star wheel contacts a trip pin on said machine tool on each rotation of said spindle and advances a cutting tool along said slide, the improvement comprising:

a. a pair of downwardly extending parallel spaced plates attached to said spindle,
b. a slide assembly, mounted between said plates, said slide assembly being pivitably mounted on said plates,
c. a plurality of arcuate slots in said plates with machine screws extending through said slots and into said slots whereby said machine screws can be tightened to hold said slide assembly at a desired angle.

2. The machine tool of claim 1 having a flexible shaft connecting said star wheel to a tool advancing mechanism on said slide.

* * * * *